United States Patent
North et al.

(10) Patent No.: US 10,095,218 B2
(45) Date of Patent: Oct. 9, 2018

(54) METHOD AND COMPUTER-READABLE MODEL FOR ADDITIVELY MANUFACTURING DUCTING ARRANGEMENT WITH INJECTOR ASSEMBLIES FORMING A SHIELDING FLOW OF AIR

(71) Applicant: Siemens Aktiengesellschaft, München (DE)

(72) Inventors: Andrew J. North, Orlando, FL (US); Juan Enrique Portillo Bilbao, Oviedo, FL (US); Walter Ray Laster, Oviedo, FL (US); Timothy A. Fox, Hamilton (CA)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 182 days.

(21) Appl. No.: 15/248,386

(22) Filed: Aug. 26, 2016

(65) Prior Publication Data
US 2018/0039254 A1 Feb. 8, 2018

Related U.S. Application Data

(60) Provisional application No. 62/370,342, filed on Aug. 3, 2016.

(51) Int. Cl.
*G05B 19/4099* (2006.01)
*B33Y 10/00* (2015.01)
(Continued)

(52) U.S. Cl.
CPC ...... *G05B 19/4099* (2013.01); *B29C 67/0088* (2013.01); *B33Y 10/00* (2014.12);
(Continued)

(58) Field of Classification Search
CPC ...... G05B 19/4099; G05B 2219/49019; F23R 3/005; F23R 3/06; F23R 2900/00018;
(Continued)

(56) References Cited

U.S. PATENT DOCUMENTS 5,664,412 A * 9/1997 Overton ............... F23C 7/008
60/39.23
5,685,242 A * 11/1997 Narato ................. F23C 6/047
110/104 B

(Continued)

*Primary Examiner* — Chun Cao
*Assistant Examiner* — Tri T Nguyen (57) ABSTRACT

Method and computer-readable model for additively manufacturing a ducting arrangement (20) in a combustion stage are provided. The ducting arrangement may include a combustor wall (40) in a combustion stage fluidly coupled to receive a cross-flow of combustion products (21). An injector assembly (12) may be in fluid communication with cooling fluid conduits (46) in the combustor wall to receive cooling fluid that passes through the cooling fluid conduits. The injector assembly may include means for injecting (24, 25, 26) a flow of the cooling fluid (22) arranged to condition interaction of a flow of reactants (19) injected with the cross-flow of combustion products. Respective duct components or the entire ducting arrangement may be formed as a unitized structure, such as a single piece using a rapid manufacturing technology, such as 3D Printing/Additive Manufacturing (AM) technologies.

17 Claims, 9 Drawing Sheets

(51) Int. Cl.
  *B33Y 50/02* (2015.01)
  *B33Y 80/00* (2015.01)
  *B29C 67/00* (2017.01)
  *G06F 17/50* (2006.01)
  *F23R 3/00* (2006.01)
  *F23R 3/06* (2006.01)
  *B29L 31/00* (2006.01)

(52) U.S. Cl.
  CPC .............. *B33Y 50/02* (2014.12); *B33Y 80/00* (2014.12); *F23R 3/005* (2013.01); *F23R 3/06* (2013.01); *G06F 17/50* (2013.01); *B29L 2031/7504* (2013.01); *F23R 2900/00018* (2013.01); *G05B 2219/49019* (2013.01); *G06F 2217/12* (2013.01)

(58) Field of Classification Search
  CPC ..... G06F 17/50; G06F 2217/12; B33Y 10/00; B33Y 50/02; B33Y 80/00; B29L 2031/7504
  See application file for complete search history.

(56) References Cited

U.S. PATENT DOCUMENTS

| | | | |
|---|---|---|---|
| 8,375,726 B2 | 2/2013 | Wiebe et al. | |
| 8,640,463 B2 | 2/2014 | Cheung | |
| 8,752,386 B2 * | 6/2014 | Fox | F23R 3/286 60/734 |
| 2014/0345286 A1 * | 11/2014 | Zupanc | F23R 3/12 60/737 |
| 2016/0320066 A1 * | 11/2016 | Lee | F24C 3/087 |
| 2018/0065277 A1 * | 3/2018 | Bremmer | B29C 33/3842 |

* cited by examiner

METHOD AND COMPUTER-READABLE MODEL FOR ADDITIVELY MANUFACTURING DUCTING ARRANGEMENT WITH INJECTOR ASSEMBLIES FORMING A SHIELDING FLOW OF AIR

CROSS-REFERENCE TO RELATED APPLICATIONS

This application claims benefit of the Aug. 3, 2016 filing date of U.S. provisional application 62/370,342 which is incorporated by reference herein.

The present application is further related to International patent application number PCT/US2016/048907 titled "Ducting Arrangement with Injector Assemblies Arranged to Form a Shielding Flow of Air in a Combustion Stage in a Gas Turbine Engine"; and International patent application number PCT/US2016/048837 titled "Combustion System with Injector Assemblies Arranged to Recapture Cooling Air In a Combustor Wall to Form a Shielding Flow of Air in a Combustion Stage", each filed concurrently herewith and incorporated by reference in their entirety.

BACKGROUND

1. Field

Disclosed embodiments are generally related to combustion turbine engines, such as gas turbine engines and, more particularly, to injector assemblies and/or a ducting arrangement including such injector assemblies, as may be used in a combustion system of a gas turbine engine.

2. Description of the Related Art

In most large stationary gas turbine engines, fuel is delivered from a fuel source to a combustion section where the fuel is mixed with air and ignited to generate hot combustion products that define working gases. The working gases are directed to a turbine section where they drive the rotation of a turbine rotor. It is known that production of NOx emissions can be reduced by reducing the residence time of the working fluid in the combustion section. One approach to reduce this residence time is to provide and ignite a portion of the fuel and air downstream of the primary combustion stage. This approach is referred to in the art as a distributed combustion system (DCS). See, for example, U.S. Pat. Nos. 8,375,726 and 8,752,386. Each of the above-listed patents is herein incorporated by reference.

DETAILED DESCRIPTION

The inventors of the present invention have recognized certain issues that can arise in known distributed combustion systems (DCSs) where a number of injector assemblies may be disposed in a combustion stage (also referred to in the art as an axial combustion stage) that may be arranged axially downstream from a main combustion stage of the combustion system. For example, by injecting a flow of reactants (e.g., a mixture of fuel and air) through a number of injector assemblies (as each may comprise an assembly of an air scoop and a fuel nozzle) disposed in the combustion stage downstream from the main combustion stage, one can achieve a decreased static temperature and a reduced combustion residence time, each of which is conducive to reduce NOx emissions to be within acceptable levels at turbine inlet temperatures of approximately 1700° C. (3200° F.) and above.

The downstream combustion stage may involve a ducting arrangement that passes a hot-temperature cross-flow of combustion products (e.g., vitiated gases from the main combustion stage) that in certain embodiments can reach relatively high subsonic speeds, which is conducive to further achieve a decreased static temperature and a reduced combustion residence time.

The present inventors have recognized that the mixing performance provided by existing injector assemblies between the flow of reactants and the cross-flow of combustion products can benefit from further improvements. More particularly, the present inventors have recognized that the greater the amount of the cross-flow combustion products that can be entrained with the injected flow of reactants prior to ignition of the fuel contained in the injected flow of reactants, the lower the flame temperature will be, and thus the lower the amount of NOx emissions that will be produced.

In view of such recognition, the present inventors propose an injector assembly designed to generate a shielding flow of air that surrounds the injected flow of reactants. This air-shielding effect transitorily separates the injected flow of reactants from the cross-flow of combustion products, thereby advantageously delaying ignition of the injected flow of reactants. This delayed ignition allows an incremental amount of cross-flow combustion products to entrain with the flow of reactants prior to stabilizing the flame formed in the downstream combustion stage.

The present inventors have further recognized that in a traditional combustion system, cooling air that may be used for cooling certain components of the ducting arrangement is generally ejected into the vitiated cross-flow of combustion products, and is essentially lost, without contributing to the combustion process, which decreases the efficiency of the engine. Accordingly, the present inventors further propose to recapture the cooling air used for cooling such components so that recaptured cooling air is efficiently reutilized to generate the shielding flow of air.

The present inventors have yet further recognized that traditional manufacturing techniques may not be necessarily conducive to a cost-effective and/or realizable manufacture of ducting arrangement configurations that may be involved to efficiently implement the foregoing approaches. For example, traditional manufacturing techniques tend to fall short from consistently limiting manufacturing variability; and may also fall short from cost-effectively and reliably producing the relatively complex geometries and miniaturized features and/or conduits that may be involved in such ducting arrangements configurations.

In view of this further recognition, in one non-limiting embodiment, the present inventors further propose use of three-dimensional (3D) Printing/Additive Manufacturing (AM) technologies, such as laser sintering, selective laser melting (SLM), direct metal laser sintering (DMLS), electron beam sintering (EBS), electron beam melting (EBM), etc., that may be conducive to cost-effective fabrication of disclosed ducting arrangements that may involve complex geometries and miniaturized features and/or conduits. For readers desirous of general background information in connection with 3D Printing/Additive Manufacturing (AM) technologies, see, for example, a textbook titled "Additive Manufacturing Technologies, 3D Printing, Rapid Prototyping, and Direct Digital Manufacturing", by Gibson I., Stucker B., and Rosen D., 2010, published by Springer, which is incorporated herein by reference.

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

The terms "comprising", "including", "having", and the like, as used in the present application, are intended to be synonymous unless otherwise indicated. Lastly, as used herein, the phrases "configured to" or "arranged to" embrace the concept that the feature preceding the phrases "configured to" or "arranged to" is intentionally and specifically designed or made to act or function in a specific way and should not be construed to mean that the feature just has a capability or suitability to act or function in the specified way, unless so indicated.

In one non-limiting embodiment, a disclosed ducting arrangement may comprise a unitized ducting arrangement. The term "unitized" in the context of this application, unless otherwise stated, refers to a structure which is formed as a single piece (e.g., monolithic construction) using a rapid manufacturing technology, such as without limitation, 3D Printing/Additive Manufacturing (AM) technologies, where the unitized structure, singly or in combination with other unitized structures, can form a component of the combustion turbine engine, such as for example respective injector assemblies, or an entire ducting arrangement including such assemblies.

Figure 1:
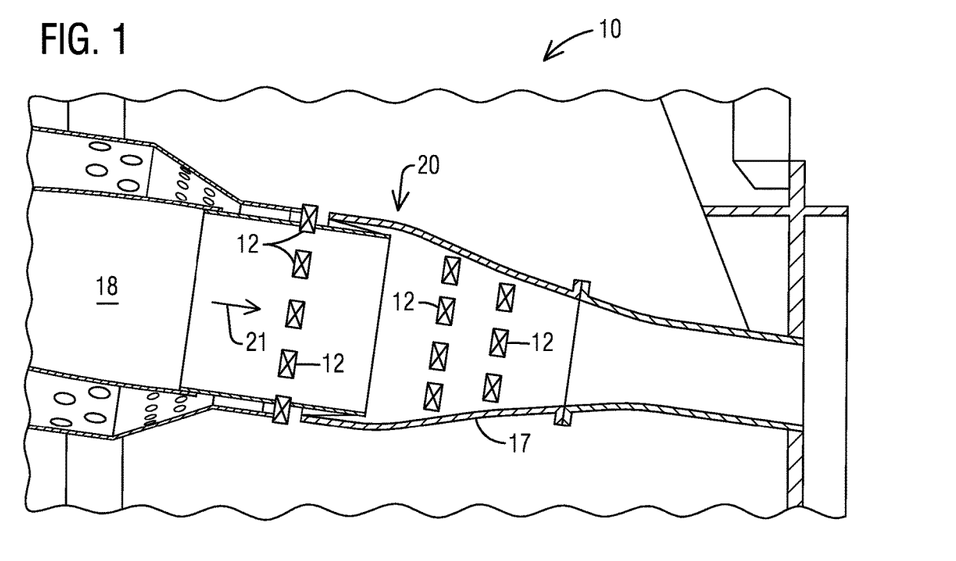
FIG. 1 is a fragmentary schematic of a disclosed ducting arrangement in a combustion system for a combustion turbine engine. The ducting arrangement can benefit from disclosed injector assemblies arranged to inject a respective flow of reactants in a combustion stage to be mixed with a cross-flow of combustion products.

FIG. 1 is a simplified fragmentary schematic of a combustor system 10 (e.g., a DCS) for a combustion turbine engine, such as a gas turbine engine. In one non-limiting embodiment, an array of spaced-apart injector assemblies 12 may be circumferentially arranged in a combustion stage (e.g., the axial combustion stage) downstream from a main combustion stage 18 of the combustor system. The downstream combustion stage is fluidly coupled to receive (e.g., through a ducting arrangement 20, as may involve a number of transition ducts) a cross-flow of hot-temperature combustion products (schematically represented by arrow 21).

As may be appreciated in FIG. 1, in one non-limiting embodiment, injector assemblies 12 may be disposed in a combustor wall or transition duct having a conical section 17 configured to accelerate the cross-flow of combustion products. In one non-limiting embodiment, injector assemblies 12 may be disposed proximate the exit of the conical section of the combustor wall or transition duct. It will be appreciated that injector assemblies 12 are not limited to conical section 17. For example, as may be further appreciated in FIG. 1, injector assemblies 12 may be disposed upstream of conical section 17. In alternative embodiments, at least some of the array of injector assemblies 12 may be disposed at different axial locations to, for example, form two or more annular rows of injector assemblies 12.

Figure 2:
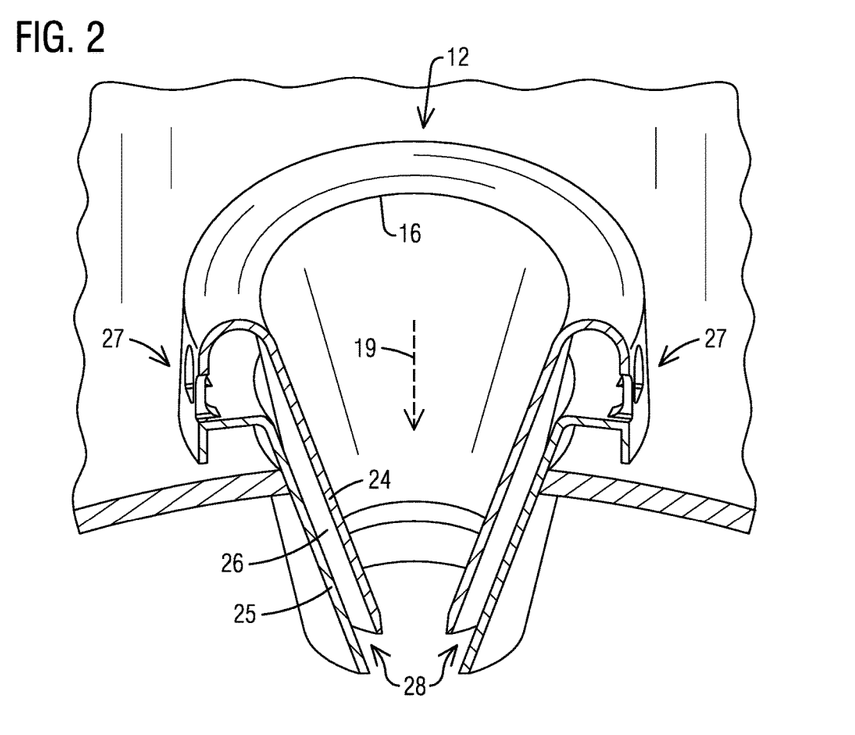
FIG. 2 is a cutaway view showing certain non-limiting structural details in connection with a disclosed injector assembly.
Figure 4:
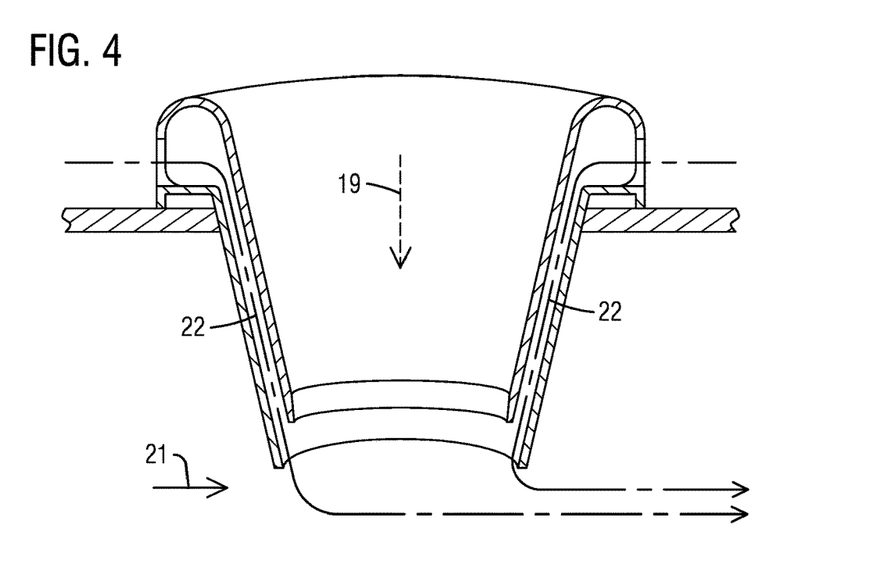
FIG. 4 is a half-sectional view of a disclosed injector assembly showing a path for air flow through a passageway constructed in the injector assembly.

As shown in FIG. 2, in one non-limiting embodiment, injector assembly 12 includes a reactant-guiding structure 16 arranged to convey a flow of reactants into the combustion stage (e.g., a mixture of fuel and air, schematically represented by arrow 19) for admixing with the cross-flow of combustion products. Injector assembly 12 further includes means for injecting a flow of air (schematically represented by arrows 22 in FIG. 4) into the combustion stage. That is, an additional flow of air which at least initially does not admix with the flow of axial stage reactants 19.

As further shown in FIG. 2, in one non-limiting embodiment injector assembly 12 may have an injector assembly body comprising an inner wall 24 and an outer wall 25 that define a passageway 26 having an inlet side 27 and an outlet side 28. The passageway defined by inner wall 24 and outer wall 25 of the injector assembly body is effective to inject the flow of cooling fluid 22 (e.g., air) into the combustion stage.

Figure 3:
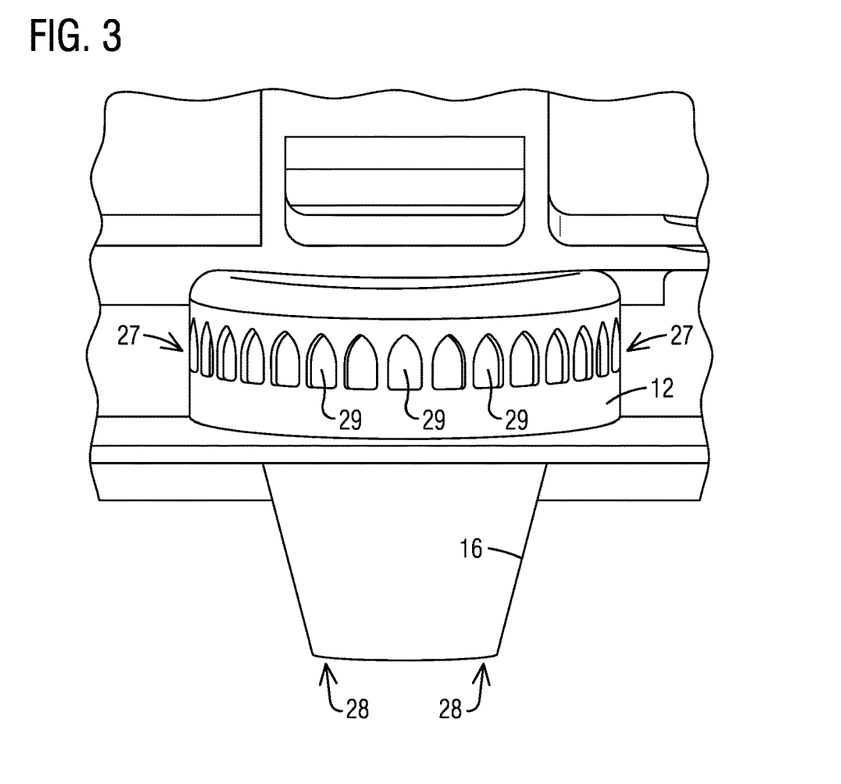
FIG. 3 is a side view of a disclosed injector assembly.

As may be appreciated in FIG. 3, in one non-limiting embodiment, at the inlet side 27 of passageway 26, injector assembly 12 includes a plurality of circumferentially arranged openings 29 that may be fluidly coupled to an air plenum (not shown); or, as described in greater detail below, may be fluidly coupled to cooling fluid conduits in a combustor wall or transition duct. It will be appreciated that openings 29 are not limited to any particular shape. Thus, the shape illustrated in the drawings for openings 29 should not construed in a limiting sense.

Without limiting disclosed embodiments to any particular principle of operation, the flow of air 22 injected into the combustion stage may be conceptualized as effective to condition interaction (e.g., an air shielding effect) of the flow of reactants 19 with respect to the cross-flow of combustion products, as the flow of reactants is admitted into the combustion stage.

Figure 5:
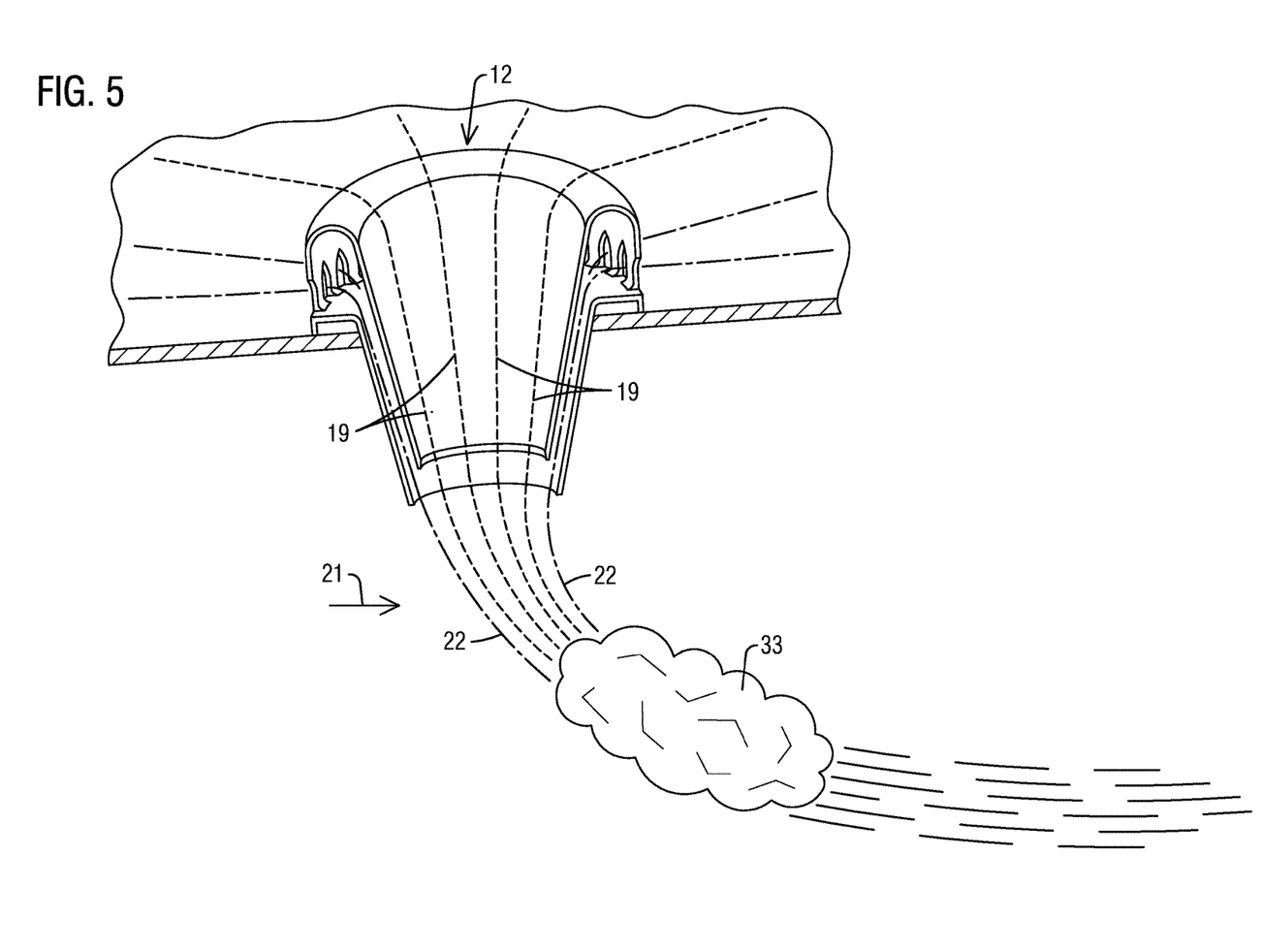
FIG. 5 is a simplified schematic for conceptualizing an air shielding effect generated by air flow injected by a disclosed injector assembly. The air flow may be configured to surround the flow of reactants injected by the injector assembly, as the flow of reactants is admitted in the combustion stage. This shielding effect causes an ignition delay to the flow of reactants injected into the combustion stage and allows a relatively longer time interval for enhancing co-flow mixing before the hot cross-flow of combustion products can ignite the flow of reactants.

FIG. 5 is a simplified schematic for conceptualizing the air shielding effect generated by air flow 22 injected by injector assembly 12. The air flow may be configured to surround the flow of reactants 19 injected by the injector assembly, as the flow of reactants is admitted in the combustion stage. This air shielding effect provides an ignition delay to the flow of reactants injected into the combustion stage and allows a relatively longer time interval for enhancing co-flow mixing (e.g., advective mixing) before the hot cross-flow of combustion products can ignite the flow of reactants.

In operation, a flame 33 generated in the axial combustion stage is incrementally shifted farther downstream than would be the case, if the disclosed air shielding effect was not provided. That is, the shield of air flow surrounding the injected flow of reactants promotes liftoff and/or increases the liftoff distance of the flame, allowing a longer time interval for entrainment of the cross-flow with the injected flow of reactants and this reduces the flame temperature, which in turn reduces the level of NOx emissions.

Figure 6:
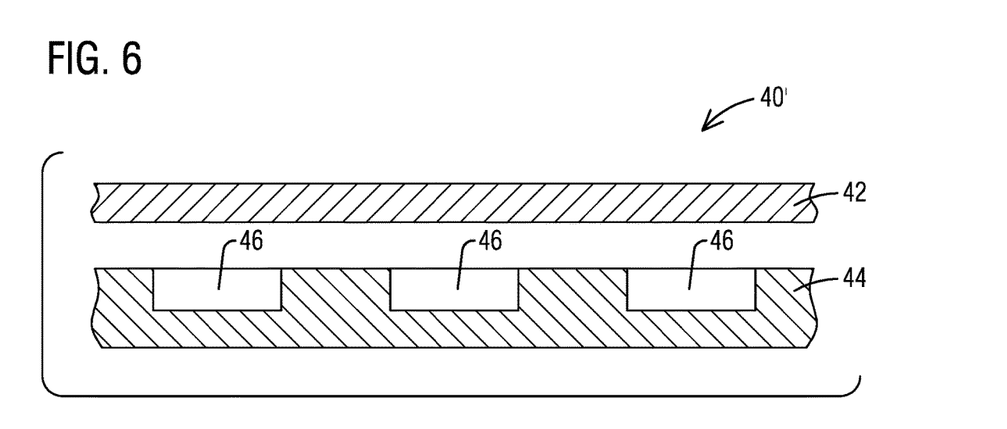
FIG. 6 is a cross-sectional, exploded view of one disclosed combustor wall or any combustor component that conveys the combustion products through the combustor system, such as a transition duct, as may comprise a multi-panel arrangement that includes a plurality of cooling air conduits that may be in flow communication with a disclosed injector assembly to recapture the cooling air to generate the shielding air flow.
Figure 7:
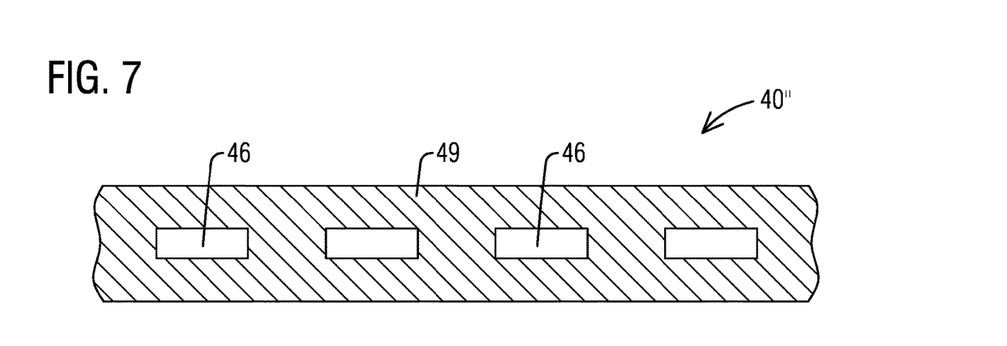
FIG. 7 is a cross-sectional view of another disclosed combustor wall or any combustor component that conveys the combustion products through the combustor system, such as a transition duct, as may comprise a unitized body that includes the plurality of cooling air conduits.
Figure 11:
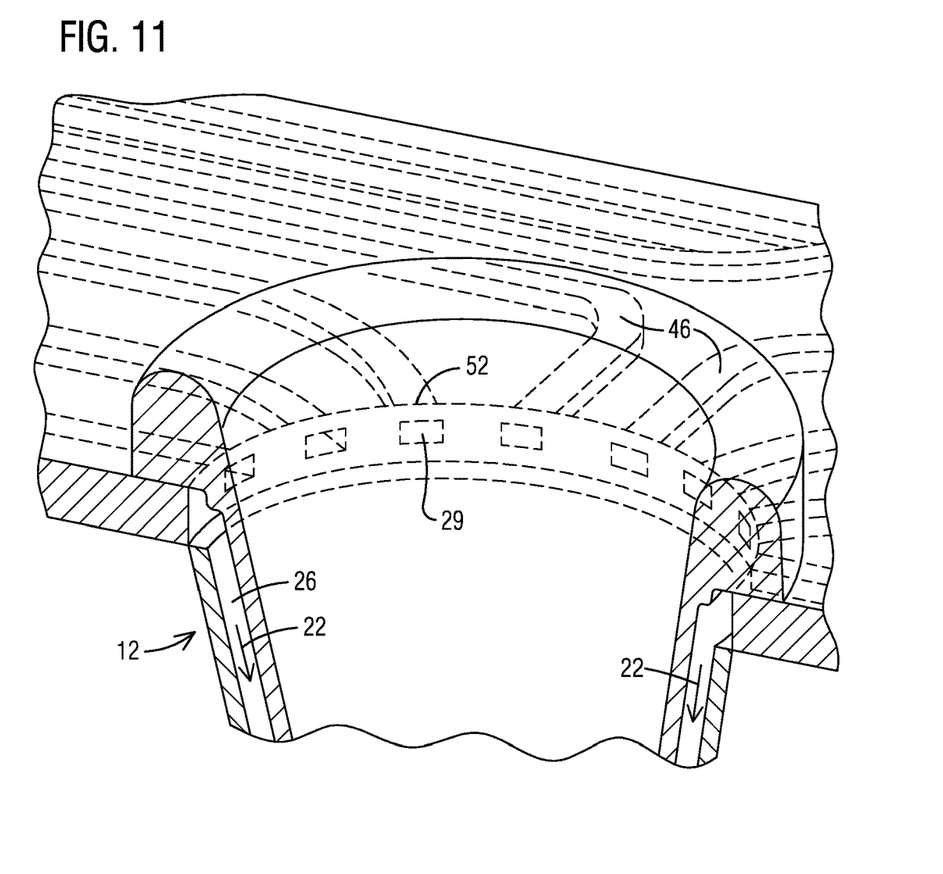
FIG. 11 is a fragmentary, cutaway isometric view showing further structural details of the injector assembly disposed at the location (shown in FIG. 9) for interfacing with a disclosed transition duct.

FIG. 6 is a cross-sectional, exploded view of one disclosed combustor wall 40' or transition duct body, such as may comprise a multi-panel arrangement 42, 44 that includes a plurality of cooling air conduits 46. FIG. 7 is a cross-sectional view of another disclosed combustor wall 40" or transition duct body, such as may comprise a unitized body 49 that includes the plurality of cooling air conduits 46. Regardless of the specific construction modality of the combustor wall or transition duct body, cooling air conduits 46 may be in flow communication with injector assembly 12 to recapture the cooling air that otherwise would be wasted to generate the shielding air flow, as shown in FIG. 11. That is, this arrangement effectively makes dual usage of the air conveyed by cooling air conduits 46: use for cooling purposes of combustor structures; and use for combustion purposes in the axial stage.

Figure 8:
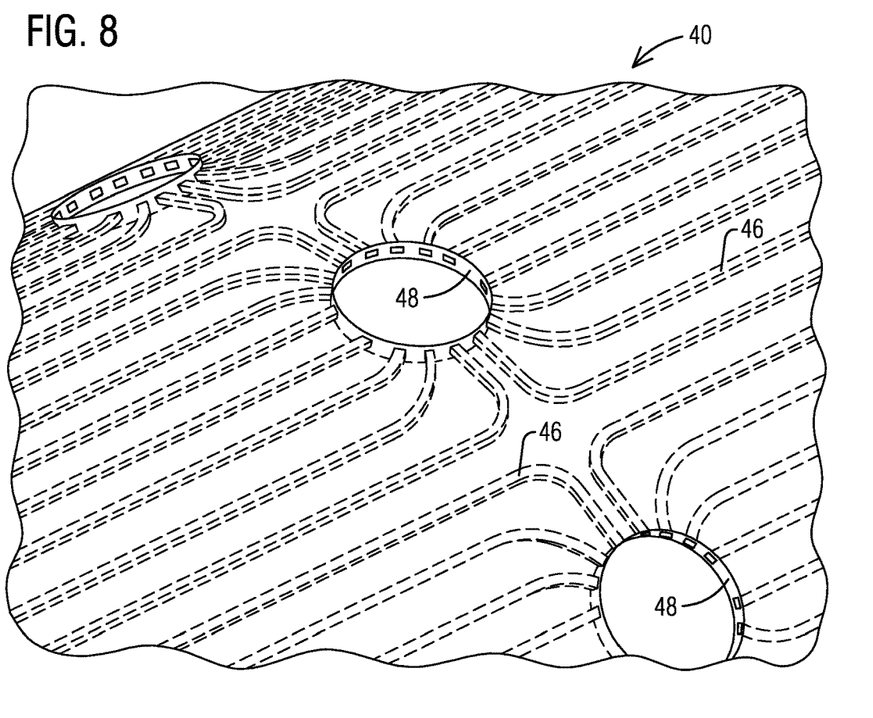
FIG. 8 is a fragmentary, isometric view of a disclosed combustor wall or any combustor component that conveys the combustion products through the combustor system, such as a transition duct, illustrating example locations for interfacing with respective disclosed injector assemblies.
Figure 9:
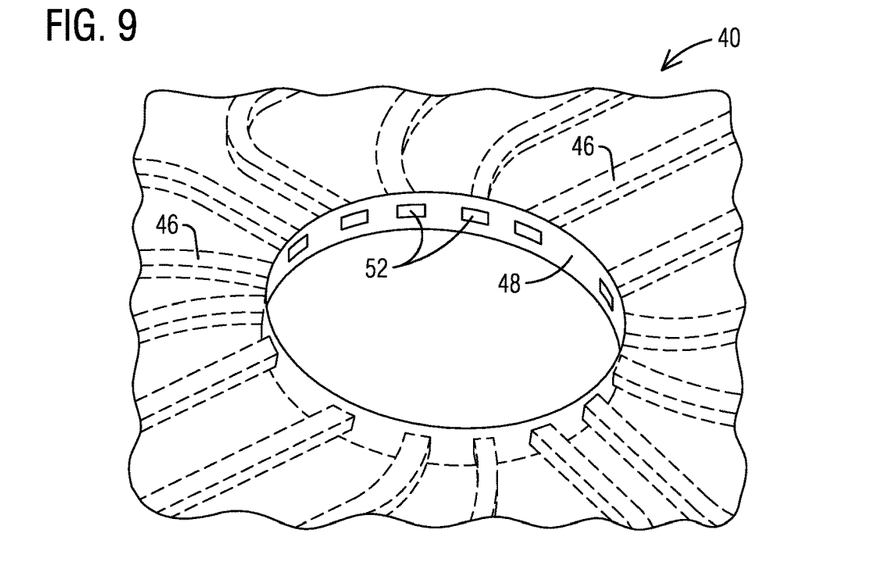
FIG. 9 is a zoomed-in view of one of the interface locations shown in FIG. 8.
Figure 10:
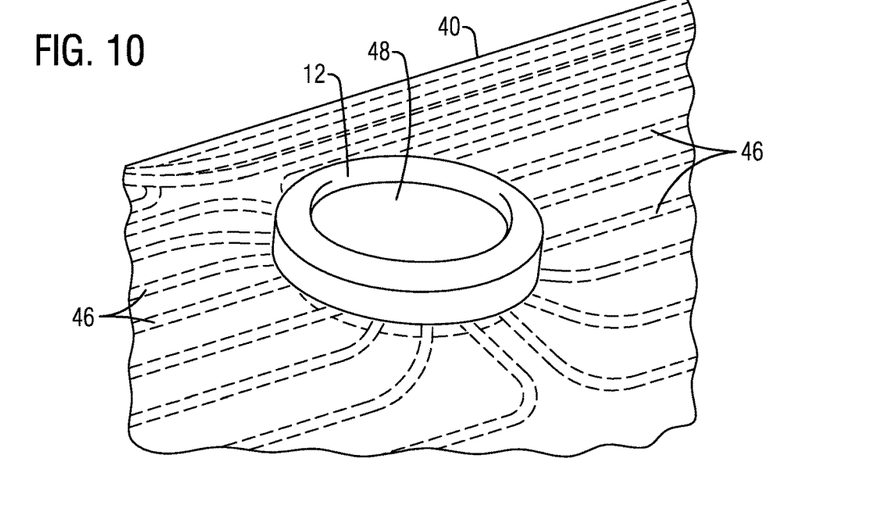
FIG. 10 is a fragmentary, isometric view of an injector assembly disposed at the interface location shown in FIG. 9.

FIG. 8 is a fragmentary, isometric view of a combustor wall 40 or transition duct body (e.g., multi-panel arrangement, unitized body, etc.) illustrating example locations 48 for interfacing with respective injector assemblies. FIG. 9 is a zoomed-in view of one such interface location 48 where one can see a plurality of outlets 52 for conveying cooling fluid (e.g., air) from a respective combustor wall 40 to a respective injector assembly 12 that may be disposed at the interface location, as seen in FIG. 10. Each outlet 52 in the transition duct is positioned to be in correspondence with a respective one of the openings 29 at the inlet side of a respective injector assembly 12, partially seen in FIG. 11. The description below proceeds to describe various non-limiting embodiments that may be optionally implemented in disclosed injector assemblies.

Figure 12:
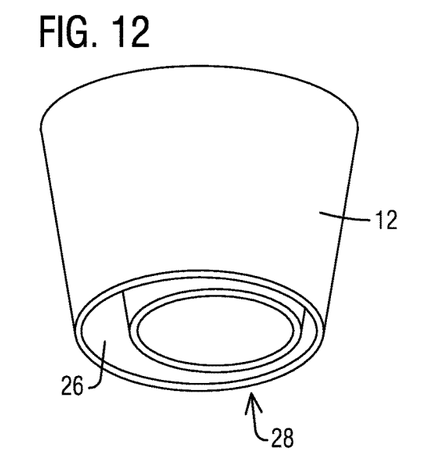
FIG. 12 is an isometric view that shows non-limiting structural details in connection with the outlet side of the passageway constructed in the injector assembly.

FIG. 12 is an isometric view that shows certain details in connection with the outlet side 28 of the passageway 26 constructed in an injector assembly 12. In this example, the outlet side 28 of passageway 26 comprises a varying cross-sectional profile along a perimeter of the outlet side so that, for example, a velocity and a volume of the injected flow of air can have a desired variation along the perimeter of the outlet side. It will be appreciated that the outlet side of the passageway may have a uniform cross-sectional profile, such as a circular profile.

Figure 13:
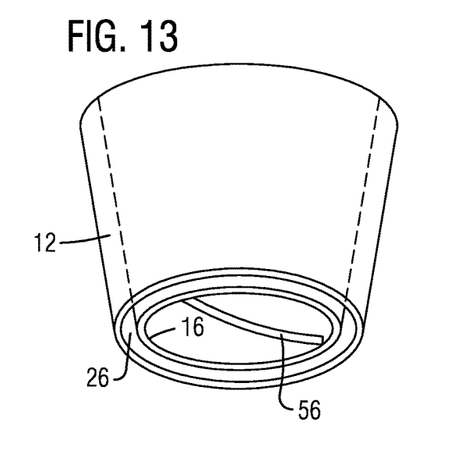
FIGS. 13-17 are respective isometric views that show further non-limiting structural details in connection with disclosed injector assemblies.
Figure 14:
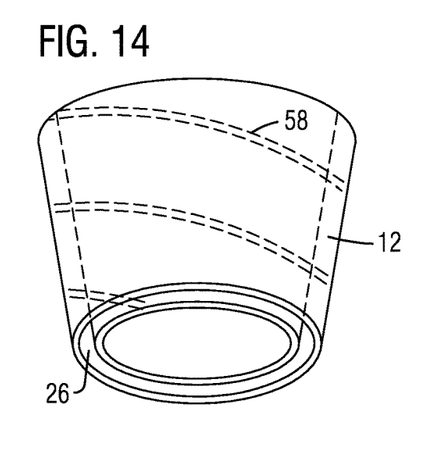

In one non-limiting embodiment, as seen in FIG. 13, reactant-guiding structure 16 of injector assembly 12 may include means for swirling 56 the flow of reactants to be injected into the combustion stage. Alternatively, as seen in FIG. 14, passageway 26 of injector assembly 12 may include means for swirling 58 the flow of cooling fluid to be injected into the combustion stage. The means for swirling 56, 58 may both be respectively included, depending on the needs of a given application.

Figure 15:
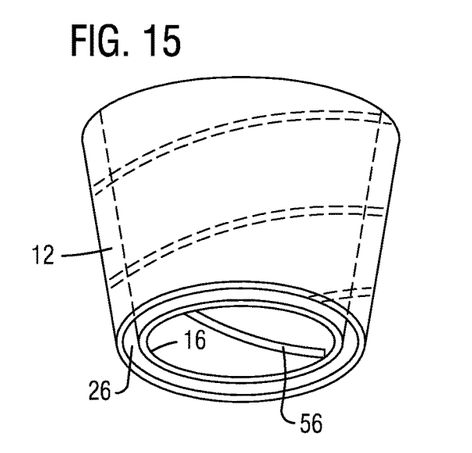
Figure 16:
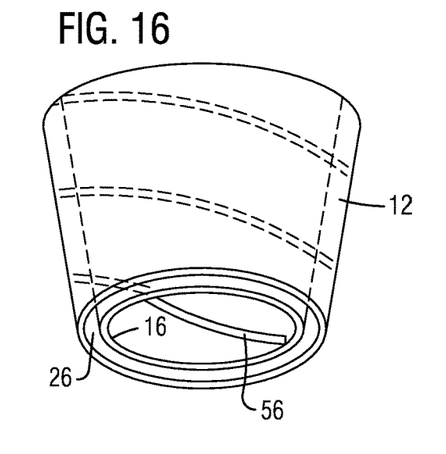

In one non-limiting embodiment, means for swirling 58 may be arranged to provide a swirl to the flow of cooling fluid along a first swirl direction, while the means for swirling 56 may be arranged to provide a swirl to the flow of reactants along a second swirl direction. In one non-limiting embodiment, the first and the second swirl directions may be arranged to provide equal swirling directions relative to one another, as shown in FIG. 15. That is, the means for swirling 56, 58 may be arranged to provide co-swirling. In another non-limiting embodiment, the first and the second swirl directions may provide opposite swirling directions relative to one another, as shown in FIG. 16. That is, the means for swirling 56, 58 may be arranged to provide counter-swirling.

Figure 17:
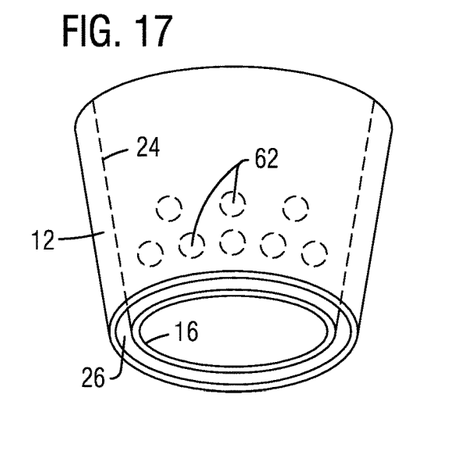

In one non-limiting embodiment, as seen in FIG. 17, a number of orifices 62 may be arranged on the inner wall 24 of injector assembly 14 to provide fluid communication between passageway 26 and reactant-guiding structure 16.

FIGS. 18-21 are respective bottom views of the respective flow outlets of an injector assembly 12 (such as outlet side 28 of passageway 26 that conveys the shielding air flow and the outlet 60 of reactant-guiding structure 16 that conveys the flow of reactants).

Figure 18:
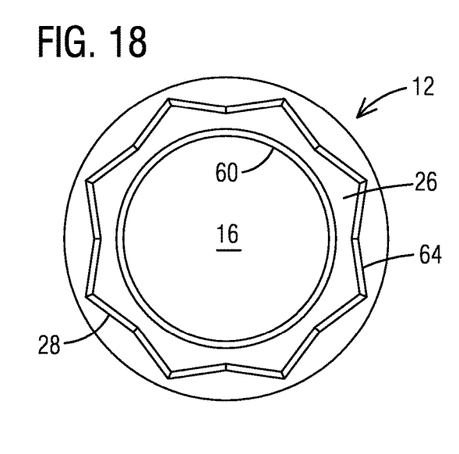
FIGS. 18-21 are respective bottom views of disclosed injector assemblies that show further non-limiting structural details in connection with disclosed injector assemblies.

In one non-limiting embodiment, as seen in FIG. 18, the outlet side 28 of passageway 26 may include geometric features 64, such as a chevron arrangement, a lobe arrangement, serrated arrangement, etc., configured to promote co-flow intermixing of the flow of cooling fluid with the flow of reactants, as each flow is respectively admitted into the combustion stage.

Figure 19:
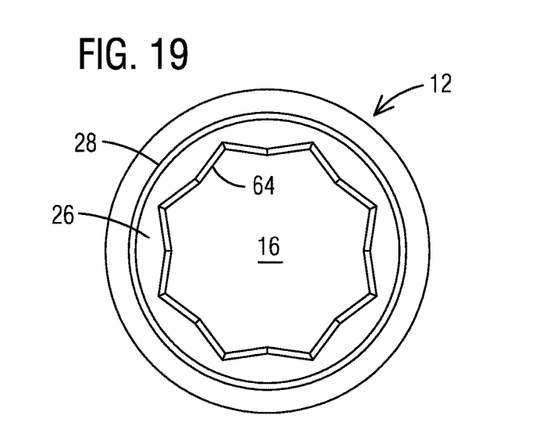
Figure 20:
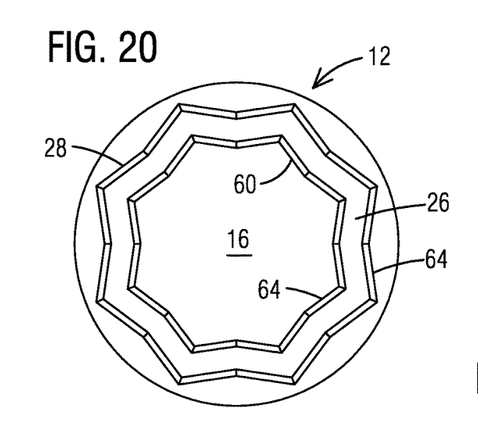
Figure 21:
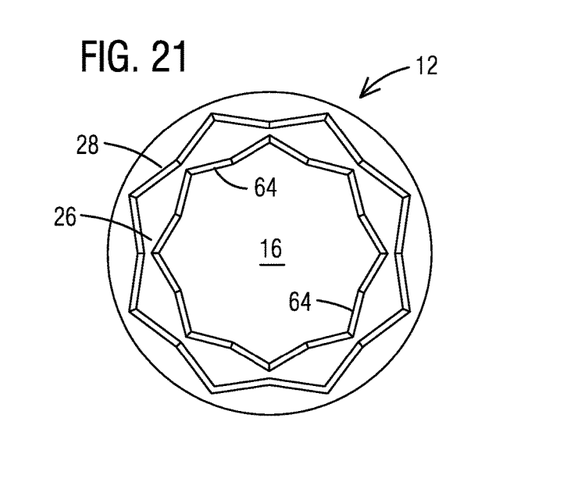

In another non-limiting embodiment, as seen in FIG. 19, the outlet 60 of reactant-guiding structure 16 may include such geometric features 64. Alternatively, both the outlet side 28 of passageway 26 and the outlet 60 of reactant-guiding structure 16 can each include respective geometric features 64, as seen in FIG. 20. If desired the respective geometric features 64 may be circumferentially staggered relative to one another as seen in FIG. 21.

Figure 22:
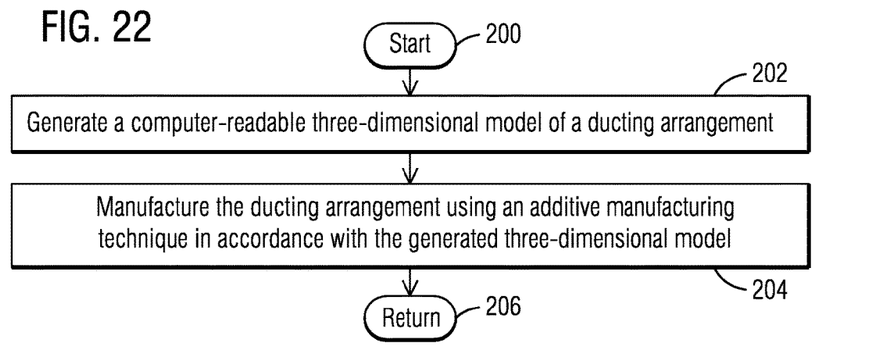
FIG. 22 is a flow chart listing certain steps that may be used in a method for manufacturing disclosed ducting arrangements.

FIG. 22 is a flow chart listing certain steps that may be used in a method for manufacturing disclosed ducting arrangements in a combustion system for a gas turbine engine. As shown in FIG. 22, after a start step 200, step 202 allows generating a computer-readable three-dimensional (3D) model, such as a computer aided design (CAD) model, of the ducting arrangement. The model defines a digital representation of the ducting arrangement, as described above in the context of the preceding figures. Prior to return step 206, step 204 allows manufacturing the ducting arrangement using an additive manufacturing technique in accordance with the generated three-dimensional model.

Non-limiting examples of additive manufacturing techniques may include laser sintering, selective laser melting (SLM), direct metal laser sintering (DMLS), electron beam sintering (EBS), electron beam melting (EBM), etc. It will be appreciated that once a model has been generated, or otherwise available (e.g., loaded into a 3D digital printer, or loaded into a processor that controls the additive manufacturing technique), then manufacturing step 204 need not be preceded by a generating step 202. It will be further appreciated that the entire ducting arrangement or one or more components of the ducting arrangement, e.g., transition duct, injector assembly, combination of transition duct with the injector assemblies, etc., may be formed as respective unitized structures using additive manufacturing in accordance with the generated three-dimensional model.

Figure 23:
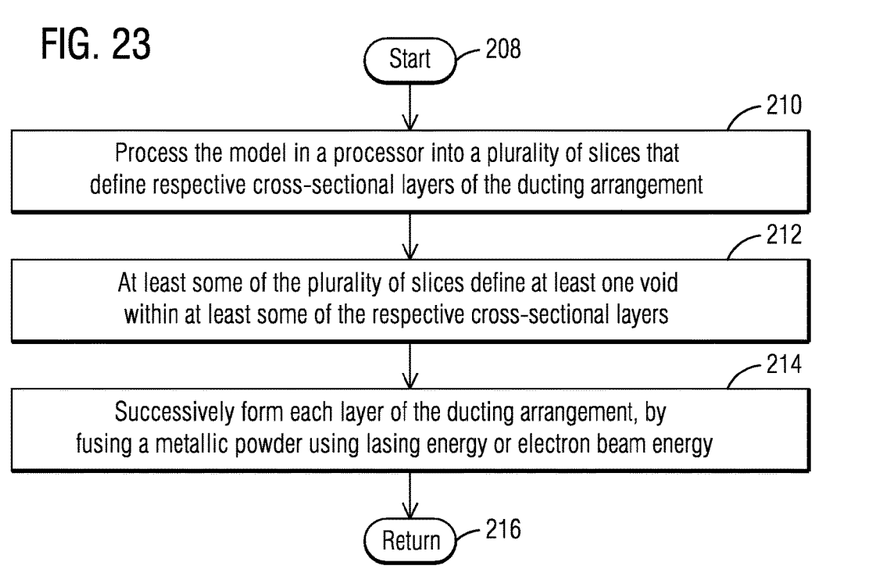
FIG. 23 is a flow chart listing further steps that may be used in the method for manufacturing disclosed ducting arrangements.

FIG. 23 is a flow chart listing further steps that may be used in the disclosed method for manufacturing the ducting arrangement. In one non-limiting embodiment, manufacturing step 204 (FIG. 22) may include the following: after a start step 208, step 210 allows processing the model in a processor into a plurality of slices of data that define respective cross-sectional layers of the ducting arrangement. As described in step 212, at least some of the plurality of slices may define one or more voids within at least some of the respective cross-sectional layers of the ducting arrangement. (e.g., respective voids that may be used to form hollow portions of ducting arrangement 20, such as interface locations 48, cooling air conduits 46 and outlets 52 (FIG. 9), passageway 26 and openings 29 in connection with injection assemblies 12, (FIG. 3 and FIG. 4)). Prior to return step 216, step 214 allows successively forming each layer of the ducting arrangement by fusing a metallic powder using a suitable source of energy, such as without limitation, lasing energy or electron beam energy.

Figure 24:
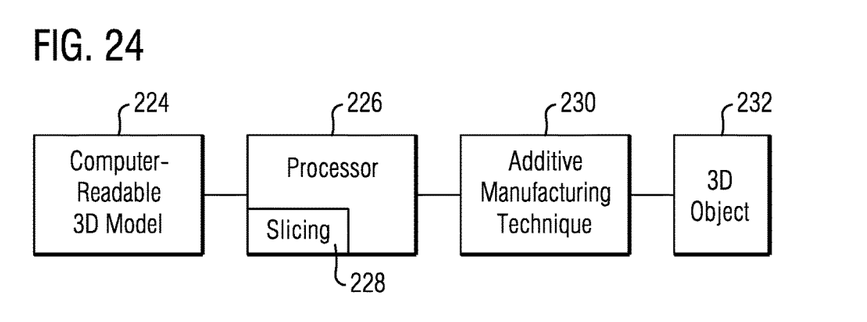
FIG. 24 is a flow sequence in connection with the method for manufacturing disclosed ducting arrangements.

FIG. 24 is a flow sequence in connection with a disclosed method for manufacturing a 3D object 232, such as ducting arrangement 20, injection assemblies 12, etc. A computer-readable three-dimensional (3D) model 224, such as a computer aided design (CAD) model, of the 3D object may be processed in a processor 226, where a slicing module 228 converts model 224 into a plurality of slice files (e.g., 2D data files) that defines respective cross-sectional layers of the 3D object. Processor 226 may be configured to control an additive manufacturing technique 230 used to make 3D object 232.

In operation at least the following advantages are believed to be achieved by disclosed embodiments: 1) The shield of air flow surrounding the flow of reactants is effective to promote liftoff and/or increases the liftoff distance of the flame generated in the downstream combustion stage allowing more time for entrainment of the cross-flow which reduces flame temperature and reduces NOx emissions; 2) autoignition flashback risk reduction and 3) the air flow that forms the shielding air additionally provides a cooling functionality, which maintains the hot side of the injector assembly body at a lower temperature thereby extending the life of the injector assembly. This cooling functionality allows for injector assemblies (e.g., scoops) that can benefit from a wide range of airflows with relatively similar cooling capability. Opposite to disclosed embodiments, the cooling in previous scoop designs was highly dependent on the total scoop flow, and thus limiting the range of airflows that could be used. In operation, disclosed embodiments are expected to be conducive to realizing a combustion system capable of achieving approximately a 65% combined cycle efficiency or greater in a gas turbine engine. Disclosed embodiments are also expected to realize a combustion system capable of maintaining stable operation at turbine inlet temperatures of approximately 1700° C. and higher while maintaining a relatively low level of NOx emissions, and acceptable temperatures in components of the engine without an increase in cooling air consumption. By reusing for combustion purposes air that was previously limited just for cooling the combustor wall, one can enhance the efficiency of the combustion system while maintaining NOx emissions below regulatory limits.

While embodiments of the present disclosure have been disclosed in exemplary forms, it will be apparent to those skilled in the art that many modifications, additions and deletions can be made therein without departing from the spirit and scope of the invention and its equivalents, as set forth in the following claims.

What is claimed is:
1. A method for manufacturing a ducting arrangement, the method comprising:
generating a computer-readable three-dimensional (3D) model of the ducting arrangement, the model defining a digital representation comprising:
a combustor wall in a combustion stage of a combustion turbine engine, the combustion stage to be fluidly coupled to receive a cross-flow of combustion products; and
an injector assembly disposed in the combustor wall, the injector assembly comprising a reactant-guiding structure arranged to convey a flow of reactants to admix with the cross-flow of combustion products, wherein the injector assembly includes a passageway having an inlet side and outlet side, the passageway configured to inject a flow of a cooling fluid arranged for conditioning interaction of the flow of reactants with the cross-flow of combustion products, the interaction conditioning based on a boundary formed by the flow of cooling fluid that surrounds the flow of reactants and is effective to provide an ignition delay to the flow of reactants injected into the combustion stage, wherein the injector assembly defined by the model has an injector assembly body comprising an inner wall and an outer wall that define the passageway, wherein at the inlet side of the passageway, the outer wall of the injector assembly body defined by the model comprises circumferentially arranged openings to be in fluid communication with respective ones of the plurality of cooling fluid conduits to receive the cooling fluid that passes through the plurality of cooling fluid conduits, and manufacturing the ducting arrangement using an additive manufacturing technique in accordance with the generated three-dimensional model.

2. The method of claim 1, wherein the combustor wall defined by the model comprises a plurality of cooling fluid conduits to be in fluid communication with the passageway in the injector assembly to convey cooling fluid that passes through the plurality of cooling fluid conduits to the passageway and form the flow of cooling fluid to be injected into the combustion stage.

3. The method of claim 1, wherein the combustor wall defined by the model comprises a conical section configured to accelerate the cross-flow of combustion products, and wherein the injector assembly is disposed upstream of the conical section of the transition duct.

4. The method of claim 1, wherein the combustor wall defined by the model comprises a conical section configured to accelerate the cross-flow of combustion products, and wherein the injector assembly defined by the model is disposed at the conical section of the transition duct.

5. The method of claim 1, wherein the combustor wall defined by the model comprises a conical section configured to accelerate the cross-flow of combustion products, and wherein the injector assembly defined by the model is disposed proximate an exit of the conical section of the combustor wall.

6. The method of claim 1, wherein the injector assembly defined by the model comprises an array of spaced apart injector assemblies circumferentially arranged in the transition body.

7. The method of claim 1, wherein the outlet side of the passageway defined by the model comprises a uniform cross-sectional profile.

8. The method of claim 1, wherein the outlet side of the passageway defined by the model comprises a varying cross-sectional profile along a perimeter of the outlet side so that a velocity and a volume of the flow of cooling fluid have a desired variation along the perimeter of the outlet side.

9. The method of claim 1, wherein the passageway defined by the model comprises a swirler disposed to swirl the flow of cooling fluid to be injected into the combustion stage.

10. The method of claim 1, wherein the reactant-guiding structure defined by the model comprises a swirler disposed to swirl the flow of reactants to be injected into the combustion stage.

11. The method of claim 1, wherein the passageway defined by the model comprises a swirler disposed to swirl the flow of cooling fluid along a first swirl direction, wherein the reactant-guiding structure defined by the model comprises a swirler disposed to swirl the flow of reactants along a second swirl direction, wherein the first and the second swirl directions comprise opposite swirling directions relative to one another.

12. The method of claim 1, wherein the passageway defined by the model comprises a swirler disposed to swirl the flow of cooling fluid along a first swirl direction, wherein the reactant-guiding structure defined by the model comprises a swirler disposed to swirl the flow of reactants along a second swirl direction, wherein the first and the second swirl directions comprise equal swirling directions relative to one another.

13. A method for manufacturing a ducting arrangement, the method comprising:

generating a computer-readable three-dimensional (3D) model of the ducting arrangement, the model defining a digital representation comprising:

a combustor wall in a combustion stage of a combustion turbine engine, the combustion stage to be fluidly coupled to receive a cross-flow of combustion products; and an injector assembly disposed in the combustor wall, the injector assembly comprising a reactant-guiding structure arranged to convey a flow of reactants to admix with the cross-flow of combustion products, wherein the injector assembly includes a passageway having an inlet side and outlet side, the passageway configured to inject a flow of a cooling fluid arranged for conditioning interaction of the flow of reactants with the cross-flow of combustion products, the interaction conditioning based on a boundary formed by the flow of cooling fluid that surrounds the flow of reactants and is effective to provide an ignition delay to the flow of reactants injected into the combustion stage, wherein the outlet side of the passageway defined by the model comprises geometric features configured to promote co-flow intermixing of the flow of cooling fluid with the flow of reactants, as each flow is respectively admitted into the combustion stage; and manufacturing the ducting arrangement using an additive manufacturing technique in accordance with the generated three-dimensional model.

14. A computer-readable three-dimensional model of a ducting arrangement for a combustion stage downstream of a main combustion stage of a gas turbine engine, wherein the model of the ducting arrangement is processable in a processor configured to control an additive manufacturing technique used to make ducting arrangements, the ducting arrangement comprising:

a combustor wall in the combustion stage in the combustion turbine engine, the combustion stage to be fluidly coupled to receive the cross-flow of combustion products; and an injector assembly comprising:

a reactant-guiding structure arranged to convey a flow of reactants to admix with the cross-flow of combustion products, wherein the injector assembly includes a passageway having an inlet side and outlet side, the passageway configured to inject a flow of a cooling fluid arranged for conditioning interaction of the flow of reactants with the cross-flow of combustion products, the interaction conditioning based on a boundary formed by the flow of cooling fluid that surrounds the flow of reactants and is effective to provide an ignition delay to the flow of reactants injected into the combustion stage, wherein the outlet side of the passageway defined by the model comprises geometric features configured to promote co-flow intermixing the flow of cooling fluid with the flow of reactants, as each flow is respectively admitted into the combustion.

15. The computer-readable model of claim 14, wherein the injector assembly has an injector assembly body comprising an inner wall and an outer wall that define a passageway having an inlet side and an outlet side, the passageway defined by the inner wall and the outer wall of the injector assembly body effective to inject the flow of cooling fluid into the combustion stage.

16. The computer-readable model of claim 15, wherein the combustor wall comprises a plurality of cooling fluid conduits in fluid communication with the passageway in the injector assembly to convey cooling fluid that passes through the plurality of cooling fluid conduits to the passageway and form the flow of cooling fluid to be injected into the combustion stage.

17. The computer-readable model of claim 14, wherein the computer-readable model is a computer aided design (CAD) model.

* * * * *